Sept. 2, 1958  A. J. JANAMAN  2,850,087
PORTABLE AUTOMOBILE SCREEN
Filed Dec. 8, 1955

INVENTOR.
ALBERT J. JANAMAN
BY
Connolly and Hutz
HIS ATTORNEYS

United States Patent Office 2,850,087
Patented Sept. 2, 1958

2,850,087
PORTABLE AUTOMOBILE SCREEN
Albert J. Janaman, New Castle, Del.

Application December 8, 1955, Serial No. 551,818

5 Claims. (Cl. 160—105)

This invention relates to a portable screen for installation in automobile windows, and more particularly to a portable automobile screen of the type which is inserted within the window channel grooves and rests on top of a partially raised window.

A practical screen for use in an automobile should be capable of easy and rapid installation. It should be neat and attractive in appearance and might also advantageously be collapsible to facilitate storage within a limited space. Another useful attribute for an automobile screen is the ability to be fitted to a range of automobile window sizes and configurations. This permits quantity production, reducing the cost of each of the units and placing them in a price category which is conducive toward sale and use. A further useful characteristic is the ability to be easily moved clear of a portion of the window opening to permit access to the outside through the window without being removed from the window.

Various types of screens have been proposed for automobile windows but they are unable to provide all of the aforementioned favorable characteristics. In one existing automobile screen a pair of relatively sliding sections are provided. The screen is installed by being firmly clamped to the top of the partially-raised window. The set screws must be firmly clamped to the upper edge of the window. The screens must be carefully adjusted to their full open position during each installation in order to position the frames at the proper clearance within the channel grooves. The relatively complicated mounting which provides the relatively sliding frame movement interferes with adapting the screen for installation within a variety or range of window sizes and shapes.

Another existing type of laterally relatively sliding window screen is provided where springs urge the lateral sections into contact with the lateral window channel grooves. This type of screen presents the same problem in adapting to various shapes and sizes. Furthermore the pressure of the side members in the window channels interferes with the upward and downward movement of the installed screen.

An object of this invention is to provide a simple, economical, portable window screen which provides a high degree of optimum operating characteristics.

In accordance with this invention a novel highly useful, attractive and economical portable automobile screen is provided by a pair of screened frame members rotatably joined by a hinge. The upper and side edges of the hinged assembly are shaped to fit within the upper and side window channel grooves of an automobile window when the assembly is inserted within the side grooves and unfolded to lie flat in a plane. The unfolded length of the assembly is determined to provide a predetermined clearance in the side window channel groove which permits the installed screen to be raised and lowered while being securely retained within the channels. A retaining clip is secured to the lower edge of one or both of the frames to hold the installed screen in firm linear contact with the top of the window. When the window is rolled downward, the screen is carried down with it to provide access to the outside through the window without removing the screen from engagement with the side window channel grooves. Sheets of flat material which may be easily cut may be provided extending from the side and top of the screen assembly to provide means for trimming the assembly to any given shape and size to facilitate installation in automobile windows over a wide range of sizes and shapes.

Novel features and advantages of the present invention will become apparent to one skilled in the art from a reading of the following description in conjunction with accompanying drawings in which.

Figure 1:
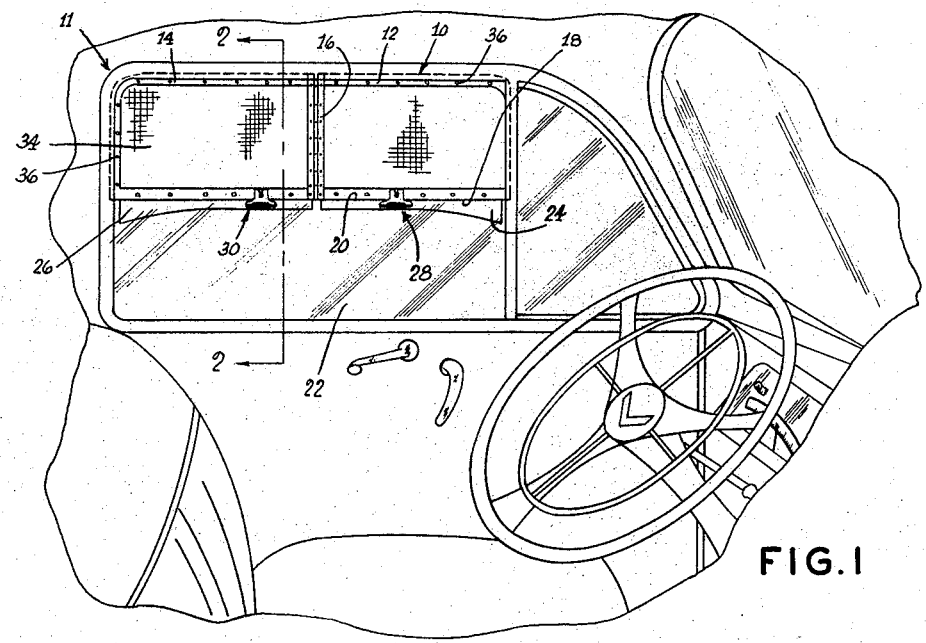
Fig. 1 is a pictorial representation of an embodiment of the present invention as it is installed in a typical automobile window.

In Fig. 1 a portable automobile screen 10 in accordance with the present invention is shown as it appears when it is installed in the window frame 11 of a typical automobile. The screen assembly 10 includes frame members 12 and 14 whdich are rotatably joined by a hinge 16. The frame members 12 and 14 may be conveniently fabricated of strip or sheet aluminum. The hinge 16 may also be conveniently fabricated of strip aluminum. The lower edge 18 of the screen rests on the upper edge 20 of the window glass 22. The lower edge 18 of the installed screen is held in firm, linear contact with the top portion 20 of the window glass 22 by flanges 24 and 26 extending downward respectively from the outer faces of the frames 12 and 14 and resilient clips or clip assemblies 28 and 30 respectively secured to the opposite faces of the lower portions of frame members 12 and 14.

Figure 2:
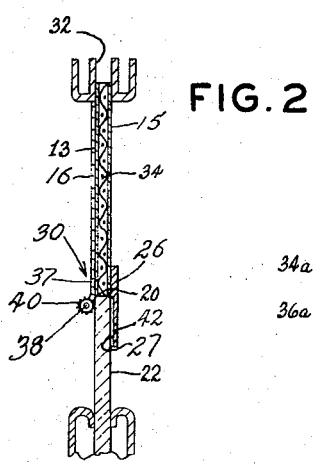
Fig. 2 is a cross-sectional view in elevation taken through Fig. 1 along the line 2—2 and looking in the direction of the arrows.

Referring to Fig. 2 in conjunction with Fig. 1 the details, construction and positioning of the screen may be ascertained. As shown in Fig. 2, the upper edge of the screen is held within window channel groove 32 and the lower edge 18 rests on the upper edge 20 of the window glass 22. Screen material 34 is secured between side pieces 13 and 15 of frame members 12 and 14 by rivets 36. The screen material is standard aluminum screening, for example. The rivets 36 are counter sunk and ground smooth to provide a flat, smooth surface. Aluminum rivets are used, for example. Other commonly-known means of retention, such as staking or sheet metal screws may be provided. When the screen assembly is made of steel or iron, spot welding might be conveniently employed, for example.

The complementary action of the flanges and clips in holding the screen in firm contact with window glass is indicated in Fig. 2 by flange 26 and clip assembly 30. The resilient clip assemblies 28 and 30 are made up of a strip of spring metal 37, a shaft or pin 38 held by the lower portion of the resilient strip 37, and a serrated resilient roller 40 which may be made of rubber, for example, which is slipped over the pin 38.

The flange 26 has a layer of felt 42 fastened to its face 27 which rests against the window to provide intimate contact with the window glass without marring the glass surface.

The overall length and edge thickness of the unfolded screen is selected to provide a slight clearance within the side window channel grooves to facilitate easy raising and lowering of the screen resting on top of the window without undue wear on the interior of the window channel groove.

Figure 3:
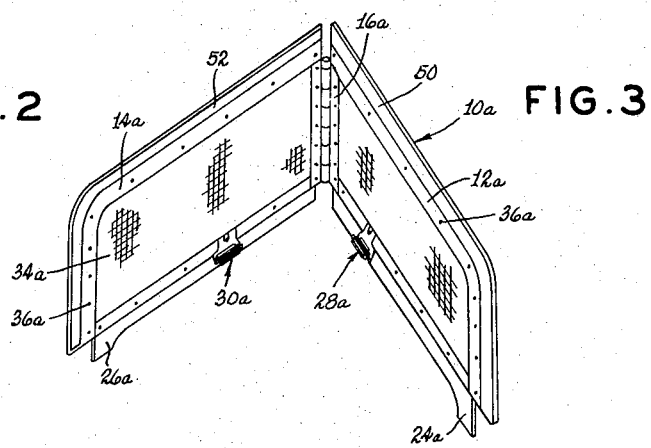
Fig. 3 is a pictorial representation of another embodiment of this invention.

In Fig. 3 another embodiment of this invention is shown which includes sheets 50 and 52 of a flat material extending outwardly from the frames to provide means for trimming the outline of the screen assembly to fit a variety of automobile window shapes and sizes. Parts shown in Figs. 3 and 4, identical to those shown in Figs. 1 and 2, are indicated by the same reference characters followed by the suffix "a".

Figure 4:
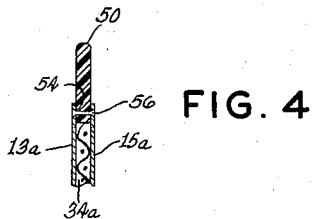
Fig. 4 is a cross-sectional view in elevation of a channel groove engaging portion of the embodiment shown in Fig. 3.

In Fig. 4 a window channel groove engaging portion of the screen 10a shown in Fig. 3 is shown to illustrate how the extending sheets 50 and 52 are conveniently respectively retained within the edge of the frame members 12a and 14a. A slot 54 is provided about the side and top peripheries of frames 12a and 14a between side pieces 13a and 15a to permit insertion of a sheet of flat material 50. This flat sheet material may be held in position by a rivet 56 or other suitable fastening means. The sheet material designated by 50 and 52 is a material which may be conveniently trimmed or cut to conform to a range of window sizes nad configurations. It may, for example, be made of composition material such as pressed fiber or plastic. Templates corresponding to the standard automobile models may be provided to facilitate trimming the frames to shape and size in the field or the shapes and sizes may be determined from the automobile windows themselves.

In installing a screen assembly 10 or 10a in the window of an automobile, the screen assembly is unfolded and held roughly in the position shown in Fig. 3 to be inserted into the automobile window. The sides of the frames are first inserted within the sides of the window channel grooves and the screen assembly is then pushed to lie flat in the plane of the window glass. The window glass 22 is then rolled up so that its edge 20 lies between the roller 40 of spring clips 28 and 30 and the faces of flanges 24 and 26. The window and screen are then rolled upward together so that the upper edge of the screen lies within the upper window channel groove. The overall length of the screen is predetermined to provide a slight clearance between base of the side window grooves and the side edges of the screen. The screen and window may be, therefore, easily moved upward and downward together while the screen rides within the side window channel grooves of the automobile. Access is, therefore, easily provided through the window for passing objects through the window or for hand signals while the screen is installed.

The structure taught by this invention provides a screen which has characteristics which are unexpectedly superior to those provided by existing automobile screens. It is neat and attractive in appearance and may be economically fabricated and assembled. It is easily installed without repetitious adjustments. It may be rolled down with the window to provide access through the window without the removal, and it may be easily adapted to fit any automobile window frame size or shape.

What is claimed is:

1. A portable screen for installation in an automobile window which includes a window glass and side and top channel grooves, said screen comprising framed members supporting a screen material, a vertically disposed hinged joint connecting said framed members, the upper and side edges of said framed members being constructed and arranged to fit with a slight clearance within said channel grooves when said framed members are inserted within said side channel grooves in a nonplanar disposition and then completely unfolded to lie substantially within a plane, depending elements extending downwardly from the lower portion of said hinged framed members, said depending elements including surfaces which are constructed and arranged to be disposed in abutting relationship with opposite sides of said window glass when said framed members are installed within said channel grooves and disposed upon the top of said glass, a resilient means reacting between said framed members and one of said depending elements in a direction to firmly grip said glass between said abutting surfaces of said depending elements, said abutting surfaces being constructed and arranged of relatively soft material having a relatively high coefficient of friction to permit said framed members to be securely anchored to the top of said glass without marring or damaging said glass for insuring in cooperation with said slight clearance that said screen is automatically carried down together with said top of said window glass when said window is lowered, and the height of said screen being substantially less than the height of said window to provide a space between the top of said screen and the top of said window when said window and attached screen are lowered together which is sufficient in area and oriented at a position relative to a motorist which permits the convenient passage of an arm therethrough and which affords clear visibility in the event that said screen becomes obstructed.

2. A portable screen as set forth in claim 1 wherein the height of said screen is less than one-half the height of said window.

3. A portable screen as set forth in claim 1 wherein one of said depending elements is comprised of a flange, the other of said depending elements includes a serrated rubber roller, said roller being attached to said lower portion of said framed members by means of a resilient spring leaf, and the surface of said flange adjacent said glass being covered with a relatively soft material.

4. A portable screen as set forth in claim 3 wherein a pair of said depending elements is attached to each of said framed members.

5. A portable screen as set forth in claim 1 wherein a sheet of flat easily-cut material extends from the top and sides of said framed members to provide means for trimming said assemblies to facilitates installation in automobile windows over a range of sizes and configurations, and said sheet of flat material is thin enough to fit with said slight clearance within said channel grooves.

References Cited in the file of this patent

UNITED STATES PATENTS

| | | |
|---|---|---|
| 1,608,785 | Evans | Nov. 30, 1926 |
| 1,906,237 | Pousha et al. | May 2, 1933 |
| 1,914,228 | Woodruff | June 13, 1933 |
| 2,540,504 | Beneteau | Feb. 6, 1951 |
| 2,568,800 | Galla | Sept. 25, 1951 |
| 2,619,168 | Leverence | Nov. 25, 1952 |